(No Model.)
C. W. HUNT & C. C. KING.
APPARATUS FOR FILLING ENDLESS CONVEYER BUCKETS.
No. 541,614. Patented June 25, 1895.
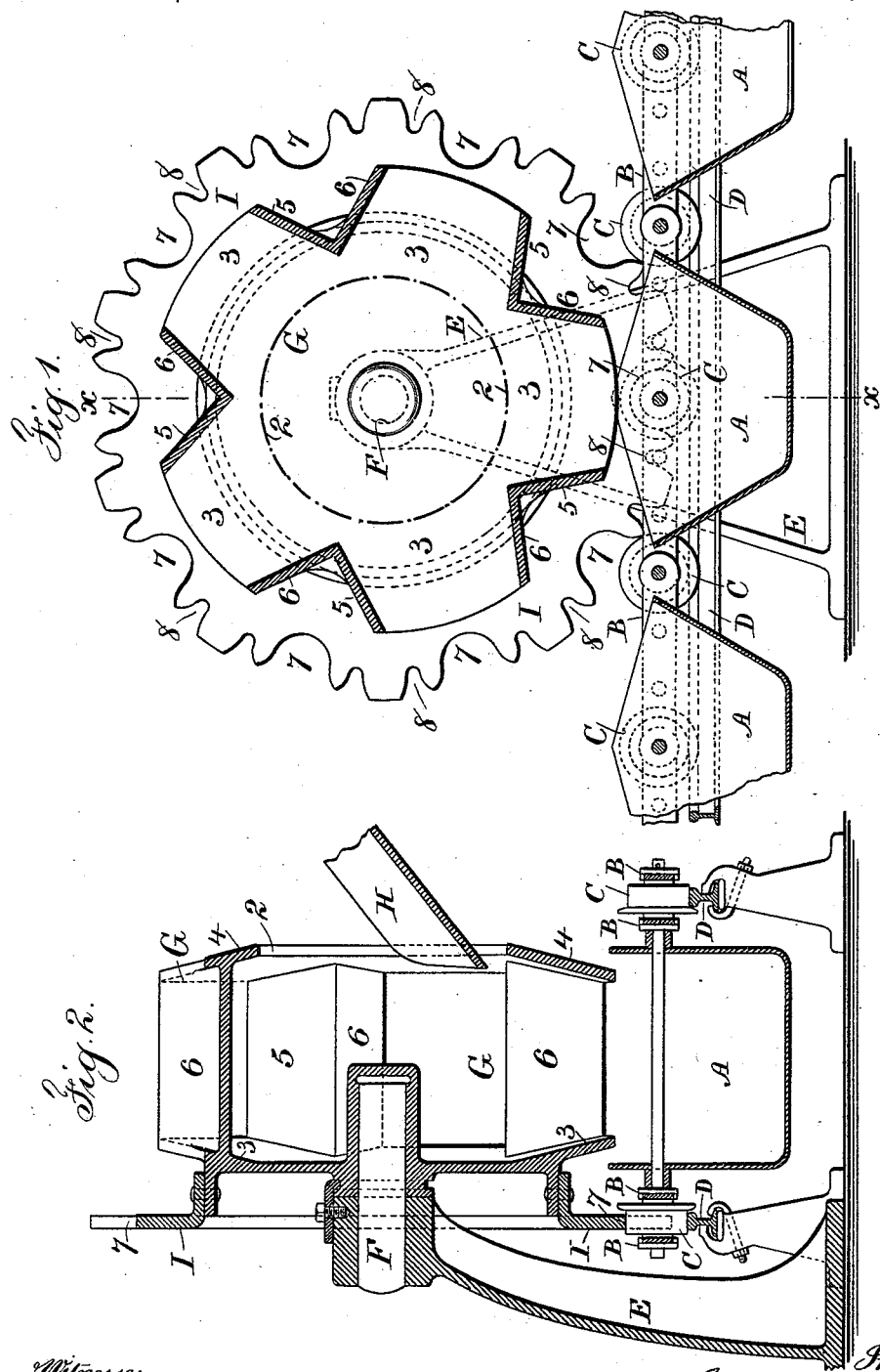

UNITED STATES PATENT OFFICE.

CHARLES W. HUNT, OF WEST NEW BRIGHTON, AND CHARLES C. KING, OF WEST BRIGHTON, ASSIGNORS TO THE C. W. HUNT COMPANY, OF NEW YORK, N. Y.

APPARATUS FOR FILLING ENDLESS-CONVEYER BUCKETS.

SPECIFICATION forming part of Letters Patent No. 541,614, dated June 25, 1895.

Application filed January 14, 1895. Serial No. 534,743. (No model.)

*To all whom it may concern:*

Be it known that we, CHARLES W. HUNT, residing at West New Brighton, and CHARLES C. KING, residing at West Brighton, county of Richmond, and State of New York, citizens of the United States, have invented an Improvement in Apparatus for Filling Endless-Conveyer Buckets, of which the following is a specification.

Conveyers have heretofore been made in which an endless range of buckets has been provided with connecting links or chains and rollers traveling upon suitable tracks and extending from the place where the buckets are filled to the place of discharge and back to the place of filling, such endless chain conveyers being employed for transferring coal or ore from one place to another or for removing ashes or similar materials. It has however been difficult to prevent the coal or other material falling down between one bucket and the next and various devices have been employed for directing the materials into the buckets, such for instance as an endless chain of hoppers represented in Letters Patent No. 466,041 to C. W. Hunt.

The object of the present invention is to more perfectly direct the coal or other material into the buckets as they pass along progressively and to dispense with any links or hinges and the wear and noise of the same and to render the apparatus durable and cheap to construct. With this object in view we make use of a shell into which the coal or other material is discharged through an opening and the shell is mounted upon a shaft or axis and it is provided with proper shaped openings at distances apart corresponding to the distances between the buckets, and upon the shell, is a gear or circular interlock engaging the endless chain conveyer so that the shell is revolved by the movement of such conveyer and each hopper of the shell goes correctly over the corresponding buckets as the endless chain conveyer is drawn along.

In the drawings, Figure 1 is an elevation of the apparatus, and Fig. 2 is a cross-section at the line *x x*.

The endless conveyer is to be of any desired character. We have illustrated such conveyer as composed of a series of gravity buckets A connected together by the chain links B and having rollers or wheels C running upon the tracks D, and it is to be understood that the buckets, the chains and the rollers are to be of any desired character and the means for propelling or drawing the endless chain of buckets along may be of any ordinary construction.

A suitable standard E is provided with a projecting shaft or arbor F for supporting the shell G which is preferably made of cast iron with an opening 2 at one side opposite to the supporting shaft F through which coal or other material is supplied by the chute or trough H and around this shell there are hopper shaped openings formed by the conical or inclined portions 3 and 4 of the shell and the intermediate cross partitions 5 and 6, such partitions 5 and 6 coming together at their inner edges and the distances apart of these hopper shaped openings around the shell correspond to the distances apart of the buckets in the endless chain conveyer.

In order to cause the shell to rotate in unison with the endless chain conveyer any suitable interlocking devices can be applied around such shell and advantageously at the closed end of the same. We have represented the rim I projecting from and attached to or formed with the shell and having in its edges notches or recesses adapted to engage portions of the endless chain conveyer that are repeated at regular intervals.

We have represented the recesses 7 in the rim I as adapted to come down over the rollers C and the recesses 8 as adapted to engage pins on the chain links so that the chain becomes a rack to give motion to the shell by the notches or recesses in the rim engaging the chain. Hence by this construction the hoppers of the shell are reliably brought into position over the buckets as the endless chain conveyer is drawn along progressively and the coal or other material that passes down the chute H falls reliably into the buckets because the partitions 5 and 6 cover the openings between the buckets as such buckets pass along in the endless chain conveyer. This shell being rotated progressively by the movement of the endless chain conveyer turns with little or no noise and it prevents the coal or other material spilling or dropping over the edges of the buckets and the movement given to the shell corresponds at all times with the movement of the endless chain conveyer so that the parts never become disarranged or ineffective.

The motive power for the chain may be connected with the shell in any desired manner, so that the shell is revolved in unison with the movement of the chain.

We claim as our invention—

1. The combination, with a conveyer having buckets in endless series, of a shell having openings around its periphery and at one side, and means for supplying coal or other materials laterally into the side opening, and means for turning the shell and moving its periphery in the same direction as and in unison with the buckets of the conveyer, substantially as set forth.

2. The combination with an endless chain conveyer having buckets, of a shell open at one side, a chute or similar device for discharging coal or other material into the shell, partitions in the shell and intermediate openings, and a shaft for supporting such shell and means for moving the periphery of the shell in the same direction as and in unison with the endless chain conveyer, substantially as specified.

3. The combination with an endless chain conveyer having buckets, of a shell, a supporting shaft upon which the shell can be rotated there being an opening in one side of the shell and inclined partitions with intermediate openings forming hoppers corresponding with the buckets in the endless chain conveyer, a rim to the shell with notches engaging the wheels and pins in the endless chain conveyer so that the shell is moved around and the partitions come over the spaces between the buckets, substantially as specified.

Signed by us this 4th day of January, 1895.

CHAS. W. HUNT.
C. C. KING.

Witnesses:
JAMES I. J. MORRIS,
GEO. S. HUMPHREY.